United States Patent [19]

Perry, Jr. et al.

[11] 4,247,313

[45] * Jan. 27, 1981

[54] GAS-PARTICULATE SEPARATOR WITH PULSE-JET CLEANABLE FILTER ELEMENTS

[75] Inventors: Marney D. Perry, Jr., Mineral Wells, Tex.; Robert A. Graff, Live Oak, Fla.

[73] Assignee: Perry Equipment Corporation, Mineral Wells, Tex.

[*] Notice: The portion of the term of this patent subsequent to Dec. 25, 1996, has been disclaimed.

[21] Appl. No.: 67,611

[22] Filed: Aug. 20, 1979

Related U.S. Application Data

[63] Continuation-in-part of Ser. No. 805,848, Jun. 13, 1977, Pat. No. 4,180,391.

[51] Int. Cl.³ .................. B01D 46/04; B01D 50/00
[52] U.S. Cl. ........................ 55/302; 55/319; 55/324; 55/334; 55/337; 55/343; 55/379; 55/396; 55/424; 55/449; 55/450
[58] Field of Search .......... 55/293, 302, 319, 324, 55/334, 337, 338, 343, 347, 348, 396, 424, 439, 449, 450, 379, 341 R

[56] References Cited

U.S. PATENT DOCUMENTS

| | | | |
|---|---|---|---|
| 1,735,298 | 11/1929 | Pfeffer | 55/396 X |
| 2,193,883 | 3/1940 | Reeves | 55/337 |
| 2,323,707 | 7/1943 | Danz | 55/396 X |
| 2,806,551 | 9/1957 | Heinrich | 55/396 X |
| 3,377,783 | 4/1968 | Young | 55/341 R X |
| 3,394,532 | 7/1968 | Oetiker | 55/302 |
| 3,630,004 | 12/1971 | Adair et al. | 55/302 X |
| 3,793,812 | 2/1974 | Willis | 55/319 X |
| 3,802,167 | 4/1974 | Turman | 55/396 |
| 3,884,660 | 5/1975 | Perry, Jr. et al. | 55/396 |
| 4,180,391 | 12/1979 | Perry, Jr. et al. | 55/324 |

FOREIGN PATENT DOCUMENTS

| | | | |
|---|---|---|---|
| 170268 | 2/1952 | Austria | 55/396 |
| 468487 | 10/1950 | Canada | 55/396 |
| 1915155 | 10/1970 | Fed. Rep. of Germany | 55/302 |
| 2550352 | 5/1976 | Fed. Rep. of Germany | 55/337 |
| 2311574 | 12/1976 | France | 55/334 |

*Primary Examiner*—Kathleen J. Prunner
*Attorney, Agent, or Firm*—Robert A. Felsman; James E. Bradley

[57] ABSTRACT

A vortical-type separator for removing from the gas stream suspended particulates present in the gas stream has an internally generated scavenging gas flow and a pulse jet system for cleaning scavenging gas filter elements. The separator has two or more conduits that are coaxially positioned with an annular clearance at their ends. A gas swirl device creates a swirling motion, causing heavier particulates to be discharged out the annular clearance or ejection port into a scavenging gas plenum. A flow path is created between the scavenging gas plenum and the outlet of the separator, with the pressure differential between the outlet and the ejection port causing scavenging gas to flow to the outlet. A frame is mounted in the flow path over which a bag filter is secured. The dust-laden scavenging gas flows through the bag filter and out the outlet. A nozzle is positioned at the mouth of the bag filter for periodically discharging a pulse of clean gas into the bag filter reverse to the flow of the scavenging gas. The pulse creates a shock wave, distending the bag filter to dislodge accumulated solids on the exterior of the bag filter.

2 Claims, 4 Drawing Figures

GAS-PARTICULATE SEPARATOR WITH PULSE-JET CLEANABLE FILTER ELEMENTS

CROSS-REFERENCE TO RELATED APPLICATION

This is a continuation-in-part of application Ser. No. 805,848 filed on June 13, 1977 now U.S. Pat. No. 4,180,391.

BACKGROUND OF THE INVENTION

1. Field of the Invention:

This invention relates in general to a separator for removing finely divided particulates from a gas stream, more particularly to a vortical-type separator that contains means for returning cleansed scavenging gas to the gas stream, with filter elements employing a pulse-jet system.

2. Description of the Prior Art:

In our copending application, Ser. No. 805,848, filed on June 13, 1977, a particulate separator with a scavenging gas separation system is disclosed. Basically, the gas stream enters tubes that are axially aligned to create annular ejection ports. A gas swirl device swirls the gas, causing particulates to be ejected from the ejection ports into the scavenging gas chamber. A flow path leads from the scavenging gas chamber to the outlet. Lower pressure at the outlet than at the ejection ports causes a flow of scavenging gas to the outlet. A separator in the flow path further cleans the scavenging gas.

In this type of separator, fine dust particles are carried by the scavenging gas flow stream into the filter element. As the scavenging gas flow passes through the filter element, dust is deposited on the outside of the filter element. Accumulated solids deposited on the exterior of the filter element must be removed by periodically creating a back flow to dislodge the solids deposited on the exterior portion of the filter elements.

There are filters in existence of the type that employ a gas pulse in the direction reverse to the flow of the gas stream to create a shock wave. The shock wave flexes and distends the filter bag, dislodging particulates. These pulse-jet filters, however, have heretofore not been used in a scavenging gas stream separator as described above.

SUMMARY OF THE INVENTION

It is accordingly a general object of the invention to provide an improved vortical-type separator.

It is a further object of this invention to provide an improved vortical-type separator that utilizes an internally generated scavenging gas flow, with means for continuously cleaning the scavenging gas filter system without interrupting the normal operation of the separator.

It is a further object of this invention to provide an improved vortical-type separator that utilizes an internally generated pressure differential to achieve a flow of scavenging gas, in combination with a pulse-jet filter assembly in the scavenging gas flow path.

In accordance with these objects, a separator is provided of the type that has a scavenging gas plenum with an inlet conduit extending into the scavenging gas plenum. A gas swirl means imparts a swirling motion to the gas entering the inlet conduit. Conduits are axially aligned with the inlet conduit to define at least one annular ejection port for the removal of suspended particulates separated from the gas stream due to the swirling motion. A flow path extends from the scavenging gas plenum to an outlet means for discharging the gas.

A flexible bag filter of filter material is secured over a frame that is mounted in the flow path for requiring all of the scavenging gas to flow through the bag filter while flowing to the outlet means. The bag filter is cylindrical and of a larger diameter than the diameter defined by the frame. Nozzles are mounted downstream from the bag filter, and point upstream into the bag filter for discharging gas. A pulse-jet control circuit supplies pulses of gas at a pressure greater than the scavenging gas pressure, causing the bag filter to distend and dislodge solids collected on the exterior of the bag filter.

DESCRIPTION OF THE PREFERRED EMBODIMENT

Figure 1:
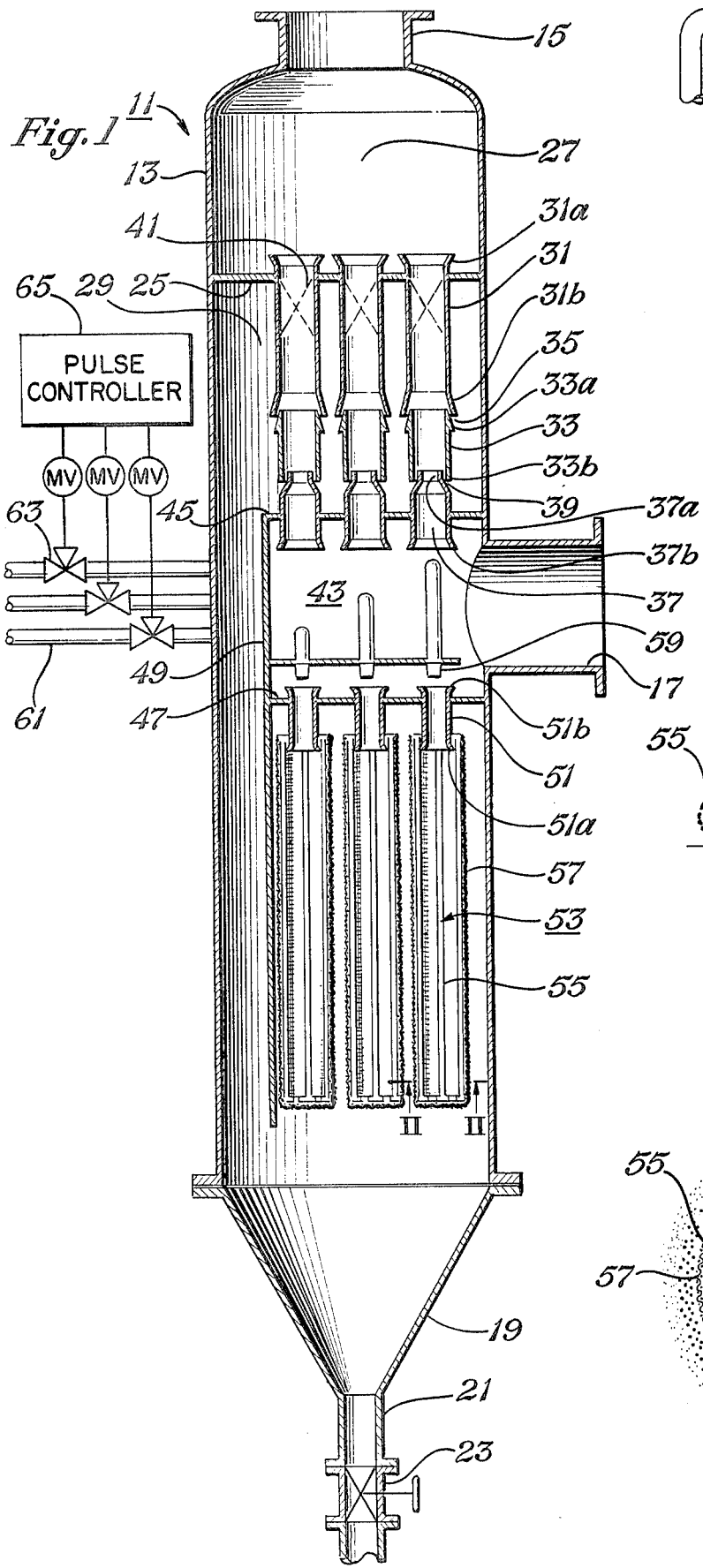
FIG. 1 is a vertical sectional view illustrating a separator constructed in accordance with this invention.

Referring to FIG. 1, a vertically oriented separator 11 is shown. Separator 11 includes a generally cylindrical housing 13 that has an inlet 15 on its upper end for receiving a gas stream. An outlet 17 is located intermediate the ends of the housing, preferably about midway along the length, for discharging the gas stream after cleansing. The bottom of housing 13 terminates in a funnel-shaped storage bin section 19 that has a downwardly extending conduit 21 controlled by valve 23 for the removal of collected dust.

A partition 25 is mounted in housing 13 perpendicular to the longitudinal axis of housing 13 and at a selected distance from inlet 15. Partition 25 extends completely across housing 13, defining an inlet plenum 27 between the partition 25 and inlet 15. The chamber below partition 25 and extending to the storage bin section 19 is a scavenging gas plenum 29.

A plurality of inlet conduit means 31 are mounted in the housing for receiving gas from a gas stream. Each conduit 31 extends through an aperture in partition 25, with an inlet end 31a in the inlet plenum 27, and an outlet end 31b in the scavenging gas plenum 29. The downstream outlet end 31b is flared outward and faces downstream.

A second group of conduits 33 are mounted below conduits 31. Each conduit 33 is in axial alignment with a conduit 31. Each conduit 33 has an upstream inlet end 33a that is coaxially located within the flared outlet end 31b of conduit 31. This positioning defines a first annular ejection port 35.

A third group of conduits 37 are mounted below and in axial alignment with the conduits 33. Each conduit 37 has an upstream inlet end 37a that is of reduced diameter and coaxially located within the outlet end 33b of conduit 33. This positioning defines a second annular ejection port 39. Conduits 33 and 37 serve as conduit means for defining annular ejection ports for the removal of suspended particulates.

A gas swirl means or vortex generator 41 is located in inlet conduit 31. Vortex generator 41 comprises two semi-elliptical baffle plates for imparting a swirling motion to the gas stream, as shown in more detail in our U.S. Pat. No. 3,884,660. Other types of swirl devices may be employed as well.

An outlet cleaned gas plenum 43 is located internally within housing 13 and serves along with outlet 17 as outlet means for discharging the cleaned gas stream. Outlet plenum 43 has an upstream wall 45 and a downstream wall 47 that are parallel with each other and with partition 25. Walls 45 and 47 are segments of a circle, extending about three-fourths of the distance across housing 13, and having a straight end or edge on the left side, as shown in the drawing of FIG. 1. An interconnecting wall 49 connects the edges of walls 45 and 47 and is perpendicular to these walls. Walls 45, 47 and 49 serve as wall means to define the outlet plenum 43. Wall 49 extends downwardly a substantial distance past the wall 47 to define a scavenging gas flow passage. Each conduit 37 is mounted in an aperture in wall 45, with its upstream end 37a in the scavenging gas plenum 29, and its outlet end 37b in the outlet plenum 43.

A fourth set of conduits 51 are mounted in apertures in wall 47 of the outlet cleaned gas plenum 43. Each conduit 51 has an upstream inlet end 51a inside the scavenging gas plenum 29, and an outlet end 51b in the outlet plenum 43. The outlet end 51b faces the outlet ends 37b of conduits 37. Only three assemblies of conduits 31, 33, 37 and 51 are shown, although in practice a larger number may be used.

A rigid, preferably metal frame 53 is secured to each conduit 51 and extends downwardly in the scavenging gas plenum 29 a substantial distance. As shown also in FIGS. 2 and 3, each frame 53 in the preferred embodiment comprises five elongated rods 55 spaced in a circular array to define a cylindrical framework. The upper ends of rods 55 are secured to the inlet end 51a of conduit 51, and the lower ends of rods 55 are secured to each other by a retainer to define a cylindrical configuration.

Figure 2:
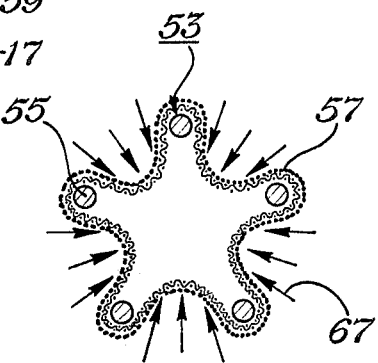
FIG. 2 is a sectional view of the separator of FIG. 1, taken along the lines from II—II of FIG. 1.
Figure 3:
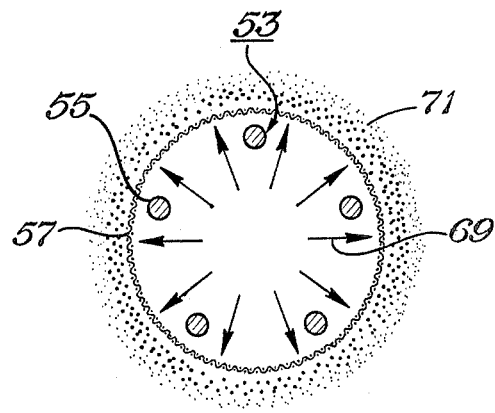
FIG. 3 is a sectional view similar to FIG. 2, but showing the bag filter in the position that occurs when a gas pulse is provided.

A fabric bag filter 57 of flexible, filter material is secured over each frame 53. Bag filter 57 is elongated and cylindrical, with an open upper end secured to the inlet end 51a of conduit 51, and a closed bottom. Bag filter 57 is of a somewhat larger diameter than the diameter defined by the circular array of frame 53, as shown in FIGS. 2 and 3.

A group of nozzles 59 are mounted in the outlet plenum 43. Each nozzle 59 faces into and is in close proximity to the outlet end 51b of each conduit 51. Each nozzle 59 is connected by a conduit 61 to a source of gas. The gas source should be able to deliver gas at a pressure from 25 to 100 psi or more (pounds per square inch) greater than the gas stream pressure flowing out of conduits 51. Each conduit 61 contains a valve indicated by numeral 62 for controlling the flow of gas to the nozzle 59. A control circuit, indicated by numeral 65, automatically controls the sequence of the opening of each valve 63, as well as the pulse duration. Only a single nozzle or a series of nozzles 59 is supplied with gas at any given time, and preferably the period or duration of the gas pulse is in the range of 100 milliseconds. The control circuit 65 preferably operates continuously, supplying gas to each conduit 51 on a rotating basis, then immediately repeating the cycle. The control circuit 65, conduits 61 and valves 63 serve as pulse-jet means for supplying a pulse of gas to the nozzles 59.

Figure 4:
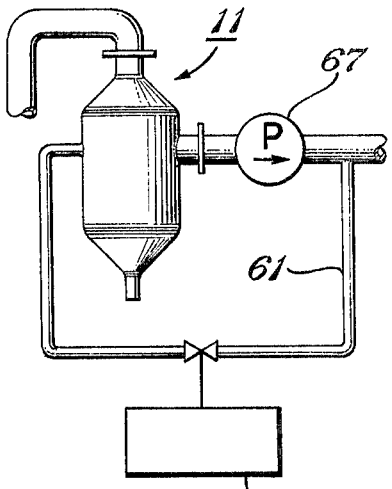
FIG. 4 is a schematic view of the separator of FIG. 1 connected to a compressor system.

As shown in FIG. 4, a typical application would involve locating this type of separator at the suction side or inlet of a gas compressor 67, where a small portion of the gas stream from the discharge side of the compression system could be utilized for the pulse-jet gas cleaning of the bag filters.

In operation, the gas stream enters the inlet 15, inlet plenum 27, and inlet conduits 31. As the gas passes the vortex generators 41, a swirling motion is created, forcing heavier components such as finely divided solids to the walls of inlet conduits 31. These particulates are forced along the walls of conduits 31 at a point downstream from vortex generators 41, and out the first ejection ports 35, along with a certain amount of gas in the gas stream. Residual particulates are forced against the walls of the second conduits 33, and are forced out the second ejection ports 39, along with a portion of gas from the gas stream. The main gas stream, thus cleansed, passes through the third conduits 37 into the outlet cleaned gas plenum 43 and out the outlet 17.

The rotating gas stream, upon contact with ejection ports 35 and 39, releases a portion of the kinetic energy contained in the gas stream, which is converged to pressure energy, and results in a pressure built-up within scavenging gas chamber 29. This results in a pressure differential between scavenging gas plenum 29 and outlet gas plenum 43. This pressure differential is employed by the use of conduits 51 to induce a flow of scavenging gas discharged from the annular ejection ports 35 and 39, through the outlet plenum 43 and into the main stream.

The dust-laden scavenging gas stream flows through the passage between wall 49 and housing 13, and enters the fabric bag filters 57, at which point the gas velocity decreases. This allows large particles to fall into the storage bin section 19. The fine dust particles are carried up by the scavenging gas flow stream into the bag filter 57. As the scavenging gas flow passes through the bag filters 57, dust is deposited on the outside of the bag filters. The filtered scavenging gas flows up through the inside of the frames 55, through conduits 51, and into the outlet plenum 43 for mixing with the clean gas stream discharged from conduits 37.

The portion of the scavenging gas plenum 29 to the left of wall 49, as seen in FIG. 1, and conduits 51 serve as flow path means extending from the scavenging gas plenum 29 to the outlet plenum 43, for the flow of gas from the scavenging gas plenum to the outlet means.

Accumulated solids deposited on the exterior of the bag filters 57 are periodically removed by directing a short pulse of gas at an elevated pressure down the inside of the bag filters. The control circuit 65 controls valve 63 to introduce a pulse of clean gas through a selected nozzle or series of nozzles 59 and into the inside of a bag filter or filters 57. A shock-wave is set up that travels down a bag filter 57 and momentarily pressurizes the bag filter, interrupting the flow of dust-laden gas into the bag filter. The bag filter flexes, discharging or dislodging the attached dust particles 71 (FIG. 3). The collected dust is thus discharged from the bag filters 57 and collected for later removal in the storage bin section 19 located at the base of the housing 13.

FIG. 2 discloses a bag filter 57 under the normal condition of receiving scavenging gas flow, indicated by arrows 67. FIG. 3 discloses a bag filter 57 at the moment that it receives a pulse from its nozzle 59, the pulse gas flow indicated by arrows 69. The filter cleaning action proceeds rotationally, a single filter bag or a series of bags at a time. The flow of dust-laden gas through the scavenging gas filter system continues on an uninterrupted basis. Each bag filter or series of bag filters being cleaned is offstream for an extremely short interval, thus the separator remains in continuous operation.

It should be apparent that an invention having a significant advantages has been provided. The separator utilizes a scavenging gas flow without the use of external blowers or a recirculating system, in combination with a pulse-jet system for maintaining the filters in the scavenging gas flow path clean. The alternating pulses allow the filters to be cleaned without interrupting the operation of the separator.

While the invention has been shown in only one of its forms, it should be apparent to those skilled in the art that it is not so limited, but is susceptible to various modifications thereof.

We claim:

1. A separator for removing from a gas stream suspended particulates present in the gas stream, comprising:
    a scavenging gas plenum defined by wall structure, the wall structure including first and second wall means which face each other and interconnecting wall means extending between the first and second wall means, defining an outlet plenum in fluid communication with an outlet;
    an inlet conduit for receiving the particulate laden gas stream, the inlet conduit extending into the scavenging gas plenum and having a downstream end located in the scavenging gas plenum;
    gas swirl means disposed within the inlet conduit for imparting a swirling motion to the gas entering the inlet conduit;
    conduit means axially aligned with the inlet conduit and having an upstream end located relative to the downstream end of the inlet conduit so as to define an annular ejection port in the scavenging gas plenum for the removal of suspended particulates that have separated from the gas stream due to the swirling motion imparted to the gas entering the inlet conduit, and for the discharge of a portion of the gas into the scavenging gas plenum, the conduit means having an outlet portion extending out of the scavenging gas plenum through the first wall means to the outlet plenum;
    a conduit having an inlet end in the scavenging gas plenum and extending from the scavenging gas plenum through the second wall means, terminating in an outlet end in the outlet plenum, providing a flow path from the scavenging gas plenum to the outlet plenum for the gas discharged from the annular ejection port;
    a rigid frame mounted to the inlet end of the conduit;
    a cylindrical bag filter having a closed end and an open mouth secured over the frame with the mouth sealed to the inlet end of the conduit, the bag filter being of flexible filter material for separating particulates from the gas flowing from the annular ejection port to the outlet plenum, and being of larger diameter than the frame;
    nozzle means mounted in the outlet plenum and pointing into the outlet end of the conduit for discharging gas into the bag filter reverse to the direction of flow of the gas flowing from the annular ejection port to the outlet plenum; and
    pulse-jet means for supplying periodic pulses of gas to the nozzle means at a pressure greater than the pressure of the gas flowing from the annular ejection port through the bag filter to distend the bag filter and dislodge particulates collected on the exterior of the bag filter.

2. A separator for removing from a gas stream suspended particulates present in the gas stream, comprising in combination:
    a generally cylindrical housing having two ends;
    a partition disposed within and extending across the housing, defining an inlet plenum between one end and the partition and a scavenging gas plenum between the other end and the partition, the housing having an inlet in communication with the inlet plenum for receiving the particulate laden gas stream;
    first and second walls mounted in the scavenging gas plenum parallel with the partition;
    a third wall connected between the first and second walls, the first, second, and third walls defining an outlet plenum in fluid communication with an outlet intermediate the ends of the housing;
    a first conduit extending through the partition with an upstream end in the inlet plenum and a downstream end in the scavenging gas plenum;
    gas swirl means disposed within the first conduit for imparting a swirling motion to the gas entering the first conduit;
    a second conduit axially aligned with the first conduit and having an upstream end located relative to the downstream end of the first conduit for defining a first annular ejection port in the scavenging gas plenum for the removal of suspended particulates that have separated from the gas stream due to the swirling motion imparted to the gas entering the first conduit, and for the discharge of a portion of the gas into the scavenging gas plenum;
    a third conduit axially aligned with the second conduit and having an upstream end located relative to the downstream end of the second conduit for defining a second annular ejection port in the scavenging gas plenum for the further removal of suspended particulates that have separated from the gas stream due to the swirling motion imparted to the gas entering the first conduit, and for the discharge of a portion of the gas into the scavenging gas plenum, the third conduit extending through the first wall, with an outlet end in the outlet plenum;
    a fourth conduit extending through the second wall and having an inlet end in the scavenging gas plenum and an outlet end in the outlet plenum, the outlet ends of the third conduit and the fourth conduit generally facing each other in the outlet plenum;
    the third wall and the housing defining a flow path between them for the flow of gas discharged from the first and second annular ejection ports to the fourth conduit;
    a rigid, elongated frame mounted to the inlet end of the fourth conduit;
    an elongated, cylindrical bag filter having a closed end and an open mouth secured over the frame with the mouth sealed to the inlet end of the fourth conduit, the bag filter being of flexible filter material for separating particulates from the gas flowing to the fourth conduit from the first and second annular ejection ports, the bag filter being of larger diameter than the frame;

nozzle means mounted in the outlet plenum and pointing into the outlet end of the fourth conduit for discharging gas into the bag filter reverse to the direction of flow of the gas flowing to the fourth conduit from the first and second annular ejection ports; and pulse-jet means for supplying periodic pulses of gas to the nozzle means at a pressure greater than the pressure of the gas flowing from the first and second annular ejection ports through the bag filter, to distend the bag filter and dislodge particulates accumulated on the exterior of the bag filter.

* * * * *